United States Patent
Weber et al.

(10) Patent No.: US 7,711,728 B2
(45) Date of Patent: May 4, 2010

(54) SYSTEM AND METHOD FOR SEARCHING FOR STATIC DATA IN A COMPUTER INVESTIGATION SYSTEM

(75) Inventors: Dominik Weber, Los Angeles, CA (US); Shawn McCreight, Pasadena, CA (US)

(73) Assignee: Guidance Software, Inc., Pasadena, CA (US)

(*) Notice: Subject to any disclaimer, the term of this patent is extended or adjusted under 35 U.S.C. 154(b) by 275 days.

(21) Appl. No.: 11/315,761

(22) Filed: Dec. 21, 2005

(65) Prior Publication Data
US 2006/0101009 A1    May 11, 2006

Related U.S. Application Data

(63) Continuation-in-part of application No. 10/936,466, filed on Sep. 8, 2004, which is a continuation of application No. 10/176,349, filed on Jun. 20, 2002, now Pat. No. 6,792,545, application No. 11/315,761, which is a continuation-in-part of application No. 10/940,092, filed on Sep. 14, 2004.

(60) Provisional application No. 60/662,968, filed on Mar. 16, 2005.

(51) Int. Cl.
*G06F 7/00* (2006.01)
(52) U.S. Cl. .................... 707/712; 707/758
(58) Field of Classification Search ............... 707/1–10
See application file for complete search history.

(56) References Cited

U.S. PATENT DOCUMENTS

| | | | |
|---|---|---|---|
| 5,475,625 A | 12/1995 | Glaschick | |
| 5,491,750 A | 2/1996 | Bellare et al. | |
| 5,819,273 A * | 10/1998 | Vora et al. | ................ 707/10 |
| 5,928,323 A | 7/1999 | Gosling et al. | |
| 5,944,791 A | 8/1999 | Scherpbier | |
| 5,944,794 A | 8/1999 | Okamoto | |
| 6,012,098 A | 1/2000 | Bayeh et al. | |
| 6,084,969 A | 7/2000 | Wright et al. | |
| 6,377,589 B1 | 4/2002 | Knight et al. | |
| 6,601,061 B1 | 7/2003 | Holt et al. | |
| 6,647,400 B1 | 11/2003 | Moran | |
| 6,792,545 B2 | 9/2004 | McCreight et al. | |

(Continued)

OTHER PUBLICATIONS

International Search Report for PCT/US2003/18063 dated Jan. 2, 2004, 6 pages.

(Continued)

*Primary Examiner*—Mohammad Ali
*Assistant Examiner*—John P Hocker
(74) *Attorney, Agent, or Firm*—Christie, Parker & Hale, LLP

(57) ABSTRACT

A system and method for concurrent investigations of static data stored in one or more secondary storage devices of one or more target machines in a data communications network. The network includes an examining machine, a secure server, and various target machines. The examining machine transmits to the target machines a search request including a search key. The examining machine also streams to each target machine metadata information and file extents of the files to be searched. The target machines concurrently search the indicated file extents for the search key. The target machines then stream the search results to the examining machine.

30 Claims, 11 Drawing Sheets

U.S. PATENT DOCUMENTS

| | | | |
|---|---|---|---|
| 6,874,088 | B1 | 3/2005 | Stevens |
| 6,889,168 | B2 | 5/2005 | Hartley et al. |
| 6,944,760 | B2 | 9/2005 | Wills |
| 7,096,503 | B1 | 8/2006 | Magdych et al. |
| 7,146,642 | B1 | 12/2006 | Magdych et al. |
| 7,370,072 | B2 | 5/2008 | Jessen |
| 2001/0011349 | A1 | 8/2001 | Garrison |
| 2002/0178162 | A1* | 11/2002 | Ulrich et al. ............ 707/10 |
| 2003/0014669 | A1 | 1/2003 | Caceres et al. |
| 2003/0172306 | A1 | 9/2003 | Cain et al. |
| 2003/0195984 | A1 | 10/2003 | Zisapel et al. |
| 2003/0196123 | A1 | 10/2003 | Rowland et al. |
| 2003/0208689 | A1 | 11/2003 | Garza |
| 2003/0229598 | A1* | 12/2003 | de Jong ............ 705/72 |
| 2004/0006588 | A1 | 1/2004 | Jessen |
| 2004/0073534 | A1 | 4/2004 | Robson |
| 2004/0098359 | A1* | 5/2004 | Bayliss et al. ............ 707/1 |
| 2004/0122908 | A1 | 6/2004 | Konopka et al. |
| 2004/0260733 | A1 | 12/2004 | Adelstein et al. |
| 2005/0097366 | A1 | 5/2005 | McCreight et al. |
| 2005/0240621 | A1* | 10/2005 | Robertson et al. ........ 707/102 |
| 2005/0268334 | A1 | 12/2005 | Hesselink et al. |
| 2006/0101009 | A1 | 5/2006 | Weber et al. |
| 2007/0011450 | A1 | 1/2007 | McCreight et al. |
| 2007/0112783 | A1 | 5/2007 | McCreight et al. |
| 2008/0082672 | A1 | 4/2008 | Garrett |

OTHER PUBLICATIONS

Civie, V. *Future Technologies from Trends in Computer Forensic Science,* IEEE Sep. 1998; Sections II and V, pp. 105-108.

International Search Report and Written Opinion for PCT/US06/39527, dated Jul. 7, 2008, 8 pgs.

Abraham, et al. *Investigative Profiling with Computer Forensic Log Data and Association Rules,* IEEE 2002, pp. 11-18.

International Search Report and Written Opinion for PCT/US05/46421, dated Jul. 21, 2008, 11 pgs.

International Search Report and Written Opinion for PCT/US07/79870, dated Sep. 15, 2008, 8 pgs.

*Honeypot Forensics Part 1: Analyzing the Network,* The Honeynet Files, IEEE Computer Society, IEEE Security & Privacy, Jul./Aug. 2004, pp. 72-78.

Supplemental European Search Report, dated Sep. 22, 2008, for Application No. EP 03734478.5, in the name of Guidance Software, Inc., 3pgs.

\* cited by examiner

SYSTEM AND METHOD FOR SEARCHING FOR STATIC DATA IN A COMPUTER INVESTIGATION SYSTEM

CROSS-REFERENCE TO RELATED APPLICATION(S)

This application claims the benefit of U.S. Provisional Application No. 60/662,968, filed on Mar. 16, 2005, and is a continuation-in-part of U.S. application Ser. No. 10/936,466, filed on Sep. 8, 2004, which is a continuation of U.S. application Ser. No. 10/176,349, filed Jun. 20, 2002, now U.S. Pat. No. 6,792,545, the content of all of which are incorporated herein by reference. This application is also a continuation-in-part of U.S. application Ser. No. 10/940,092 filed on Sep. 14, 2004, the content of which is incorporated herein by reference.

FIELD OF THE INVENTION

This invention relates generally to computer investigation systems, and more specifically, to a system and method for efficiently searching for data stored in secondary storage devices coupled to one or more target devices during an online investigation of those devices.

BACKGROUND OF THE INVENTION

U.S. Pat. No. 6,792,545, assigned to the Assignee of the present application, discloses a system and method for performing secure investigations of networked devices over a computer network. Part of such investigation entails the searching of one or more secondary storage devices for specific patterns or data. According to one prior art mechanism, an examining machine downloads the data to be searched from the networked devices and searches the data for specific patterns locally at the examining machine. Clearly, such a mechanism wastes bandwidth and resources of the examining machine.

Accordingly, what is desired is a system and method in a computer investigations system for efficiently searching secondary storage devices for specific data patterns during an online investigation of those devices.

SUMMARY OF THE INVENTION

According to one embodiment, the present invention is directed to a method for investigating data stored in one or more storage devices coupled to a plurality of target devices in a networked computer investigation system. The system includes a client device, first and second target devices coupled to the client device over a data communications network, first and second storage devices coupled respectively to the first and second target devices, and a server brokering secure communication between the client device and the first and second target devices over the data communications network. The client device receives a search key and identifies a first file stored in the first storage device coupled to the first target device and a second file stored in the second storage device coupled to the second target device. The client device further streams the search key and a plurality of first file extents associated with the first file to the first target device and a plurality of second file extents associated with the second file to the second target device. Each file extent identifies a specific range of data to be searched. The first and second target devices respectively receive and process the streamed first and second file extents, concurrently search a range of data specified in a received file extent for the search key, and generate search results based on the search.

According to one embodiment of the invention, the client further maintains a file directory of files stored in the first and second storage devices and retrieves file properties information on the first and second files. The file properties information may include file access information that is streamed to the first and second target devices for respectively accessing the first and second files.

According to one embodiment of the invention, the received first and second file extents are stored in respectively first and second in-queues at respectively the first and second target devices. The client device monitors fullness of the first and second in-queues and, responsive to the monitoring, streams a second plurality of first file extents associated with the first file to the first target device and a second plurality of second file extents associated with the second file to the second target device.

According to one embodiment of the invention, first and second search results are stored in respectively first and second out-queues at respectively the first and second target devices. The client device polls a particular out-queue coupled to a particular target device during a polling period. Responsive to the poll, the particular target device streams one or more search results stored in the particular out-queue.

According to one embodiment of the invention, the server establishes secure communication with the client device over a data communications network and further establishes secure communication with each of the target devices for allowing secure communication between the client device and each of the target devices.

According to one embodiment of the invention, the client device identifies a third file stored in a particular storage device coupled to a particular target device, retrieves file properties of the third file, determines based on the file properties whether the third file meets one or more filter criteria, transmits a request to the particular target device for the third file responsive to the determination, receives the third file from the particular target device responsive to the request, and locally searches the third file responsive to the filtering. The one or more filter criteria may be a size of the third file.

According to one embodiment of the invention, the first and second storage devices are hard disks on different computers/servlets.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

Figure 1:
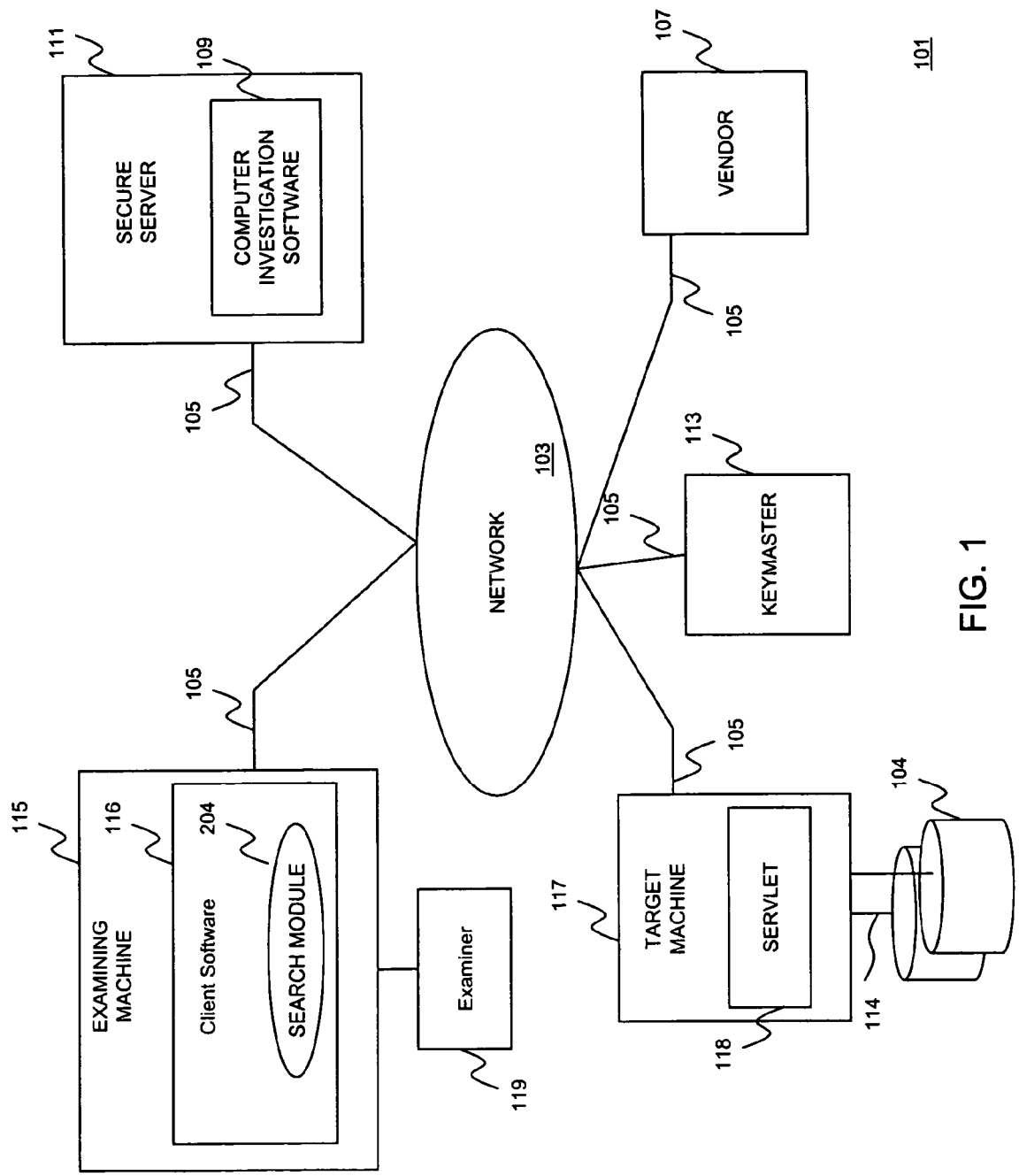
FIG. 1 is a block diagram of an exemplary computer investigation system allowing concurrent investigation of data stored in one or more target machines in an organization's computer network according to one embodiment of the invention.

FIG. 1 is a block diagram of an exemplary computer investigation system 101 allowing concurrent investigation of data stored in one or more target machines 117 in an organization's computer network. The computer investigation system 101 includes various network devices coupled to a data communications network 103 over data communication links 105. The data communications network 103 may be a computer network, such as, for example, a public Internet, a private wide area network (WAN), a local area network (LAN), or other network environment conventional in the art. The network devices may include a vendor computer 107, a secure server 111, an examining machine 115, one or more target machines 117, and a keymaster computer 113. The data communication link 105 may be any network link conventional in the art, such as, for example, an Ethernet coupling.

A vendor having access to the vendor computer 107 provides the organization with a computer investigation software 109 which enables the organization to effectively perform forensic investigations, respond to network safety alerts, and conduct network audits over the data communications network 103. The computer investigation software 109 may also allow other investigations of networked devices in addition to forensic investigations as evident to those of skill in the art.

The investigation software is installed in a local memory of the secure server 111 allocated to the organization. According to one embodiment of the invention, the computer investigation software 109 provides computer program instructions which, when executed by one or more processors resident in the secure server 111, cause the secure server to broker safe communication between the examining machine 115 and the target machines 117. The computer investigation software further facilitates the administration of users, logs transactions conducted via the server, and controls access rights to the system.

The examining machine 115 (which may also be referred to as the client) allows an authorized examiner 119 to conduct searches of the target machines 117. In this regard, the examining machine 115 includes a client software 116 which includes the functionality and interoperability for remotely accessing the secure server 111 and corresponding target machines 117. According to one embodiment of the invention, the client software 116 includes a search module 204 and associated graphics user interface (GUI) for commanding a plurality of the target machines 117 to concurrently search their associated secondary storage devices for particular data patterns (hereinafter referred to as search keys). The data patterns may be text, audio, images, and the like.

The search module 116a may be implemented as a software module that is executed by one or more processors resident in the examining machine 115, and may include one or more sub-modules dedicated to different aspects of the search and/or user interface. Furthermore, the search module 204 may be included as part of the client software 109, or reside as a module separate from the client software.

Each target machine 117 is exemplarily the subject of a computer investigation conducted by the examining machine 115. Each target machine 117 is coupled to one or more secondary storage devices 104 over an input/output connection 114. The storage devices include any nonvolatile storage media such as, for example, hard disks, diskettes, Zip drives, redundant array of independent disks (RAID) systems, holographic storage devices, and the like.

According to one embodiment, a servlet 118 installed on a particular target machine 117 responds to commands provided by the examining machine 115 to remotely discover, preview, and acquire data from one or more files stored in its associated secondary storage device 104, and stream information on the acquired data to the examining machine via the secure communication path created between the target machine 117 and the examining machine. According to one embodiment of the invention, there is a different servlet associated with each secondary storage device 104.

The computer investigation system 101 illustrated in FIG. 1 further includes an examiner 119 who has direct or remote access to the examining machine 115 in any manner conventional in the art. According to one embodiment of the invention, the examiner is a trusted individual who safely stores in the examining machine 115, one or more encryption keys used for authenticating to the secure server 111 and conducting the secure investigation of the target machines 117, as is described in more detail in U.S. Pat. No. 6,792,545.

Figure 2:
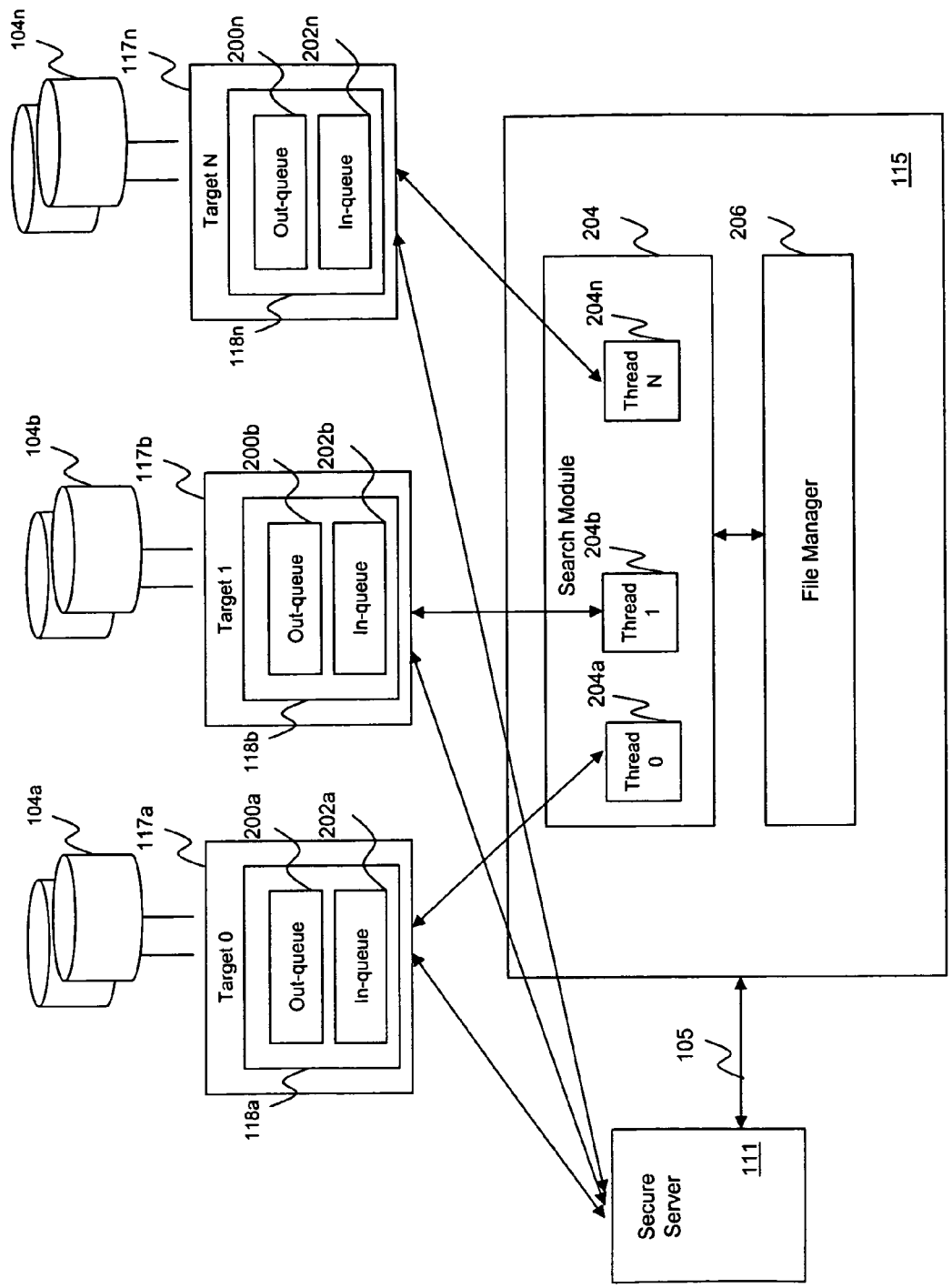
FIG. 2 is a conceptual layout diagram for conducting a parallel search of data in one or more files stored in various secondary storage devices of various target machines according to one embodiment of the invention.

FIG. 2 is a conceptual layout diagram for conducting a parallel search of data in one or more files stored in secondary storage devices 104a-104n of target machines 117a-117n according to one embodiment of the invention. Such data may also be referred to as static data. The parallel search is conducted by the servlets 118a-118n installed in the respective target machines 117a-117n in response to the examiner's command to search the secondary devices 104a-104n of the target machines for a particular search key. According to another embodiment, search of predetermined terms or data patterns may be automatically invoked in response to receipt of an alert of an intrusion on the network, or based on a routine network audit schedule.

According to one embodiment of the invention, the search is multi-threaded on both the examining machine 115 and the servlets 118a-118n. The examining machine spawns processing threads for each of the target machines 117a-117n to be searched, and each of the target machines receiving a search request from the examining machine spawns a thread for handling the request.

According to one embodiment of the invention, the examining machine 115 includes a file manager 206 which maintains for each secondary device 104a-104n, a file directory of files stored in the device and file properties associated with each file. The file properties may include but are not limited to file size, one or more locations on the secondary device where one or more blocks of file data is stored, information on whether the file is a regular, encrypted, or compressed file, and/or any information for accessing, decrypting, and/or decompressing the file (e.g. decryption keys). Any addressing scheme may be used for specifying the location of the one or more blocks of file data, such as, for example, cylinder-head-sector addressing, logical block addressing, or the like.

The file manager 206 is coupled to the search module 204 which uses the information on the files to control the searches conducted by the target machines 117a-117n. In the illustrated embodiment, the search module 204 generates processing threads 204a-204n for the N target machines 117a-117n, and the processing threads concurrently transmit a search request to the target machines. The search request may include, for example, the search key that is to be searched by the servlets. According to one embodiment of the invention, the search key may be preprocessed for generating a search object, and the search object may be transmitted to the servlets as the search request. Upon receipt of the search request by the servlets, the servlets generate processing threads dedicated to the commanded search.

According to one embodiment of the invention, the processing threads 204a-204n created by the examining machine stream metadata including information specific to the file to be searched, and/or file extents including a range of data in the relevant secondary storage unit that is to be searched. As the streamed metadata and/or file extents are received by the servlets 118a-118n, they are processed in turn by the dedicated processing thread spawned by each servlet. According to one embodiment of the invention, the processing includes remotely conducting the search of the search key at the indicated file extent by the servlet. The received metadata and/or file extents waiting to be processed are stored in an in-queue 202a-202n maintained at each target machine until retrieved by the dedicated processing thread.

According to one embodiment of the invention, the search module 204 is kept aware of the fullness of the various in-queues 202a-202n. The search module 204 stops streaming the metadata and/or file extents to a particular target machine if its in-queue is detected to be full. As the in-queue is emptied, the search module 204 streams enough metadata and/or file extents to fill up the in-queue. In this manner, the size of the in-queues 202a-202n may be kept bounded, minimizing the memory requirement of the servlets 118a-118n.

In addition to the in-queues, the servlets include out-queues 200a-200n used to store information on the search hits as the search of each file extent is conducted. Such hit information may include the location on the secondary storage device in which the search key was found, the length of data, the particular search key that was found, and the like.

The hit information is then periodically streamed to the examining machine 115. In this regard, each thread 204a-204n spawned by the examining machine polls the servlets 118a-118n at periodic intervals requesting for any search hits. In response, each servlet streams to the examining machine 115 any hit information stored in the out-queue. According to one embodiment of the invention, if a particular out-queue is full, the associated servlet pauses its search process until the out-queue is emptied on a next polling period.

According to one embodiment of the invention, there is only one in-queue and out-queue pair per servlet-client pair.

Figure 3:
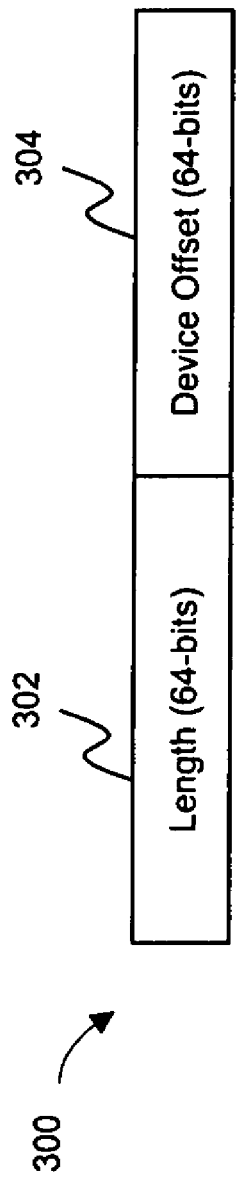
FIG. 3 is a conceptual layout diagram of a file extent according to one embodiment of the invention.

FIG. 3 is a conceptual layout diagram of a file extent according to one embodiment of the invention. The file extent contains length 302 and device offset 304 information, which may, as illustrated in this example, be each composed of 64-bits. The device offset 304 is a beginning location in a particular secondary device storing one range of file data that is to be searched. The length is a number of bytes of the range of file data.

Figure 4:
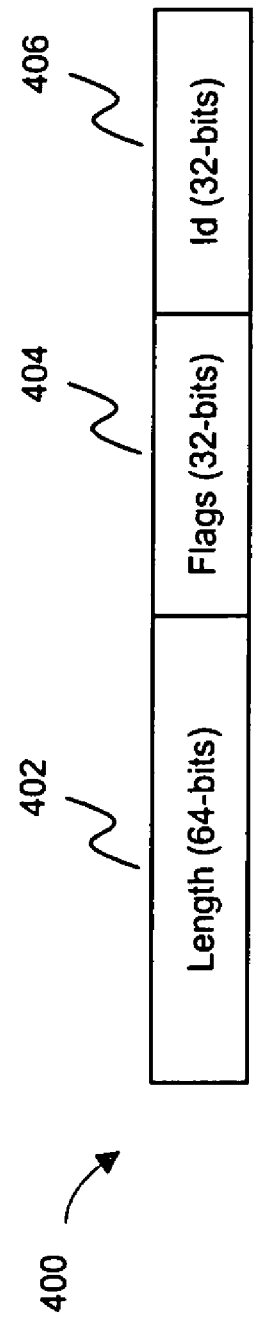
FIG. 4 is a conceptual layout diagram of metadata according to one embodiment of the invention.

FIG. 4 is a conceptual layout diagram of metadata 400 according to one embodiment of the invention. The metadata 400 is used to provide information on the secondary devices and file properties for use by the servlets in conducting their searches. In the illustrated embodiment, the metadata follows the format of a file extent, where the first 64-bits are allocated to a length field 402, and the next 64-bits are equally allocated to a flags field 404 and an ID field 406. According to one embodiment of the invention, the length field 402 in a metadata packet is set to "0," and may be used to distinguish a metadata packet from a file extent. The flags field 404 indicates a device or file type, and the ID field 406 indicates a device or file ID, based on the setting of the flags field 404, for identifying a proper secondary device or file to be searched. The flags field 404 may further include various file flags, such as, for example, flags that indicate that the file is compressed, encrypted, or the like.

Figure 5:
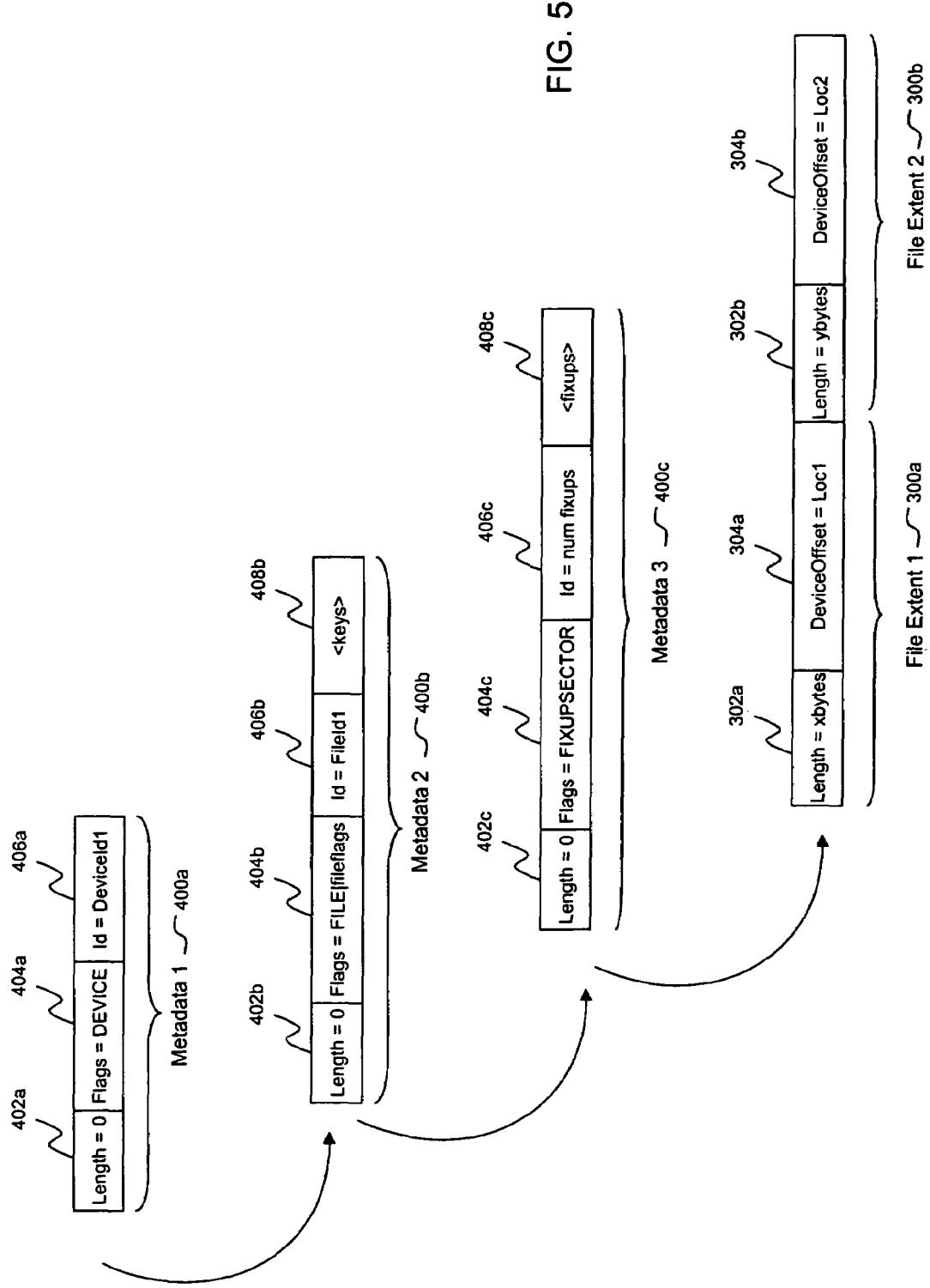
FIG. 5 is a conceptual layout diagram of an exemplary stream of data packets that may be sent for searching a particular file according to one embodiment of the invention.

FIG. 5 is a conceptual layout diagram of an exemplary stream of data packets that may be sent to the servlets for searching a single file according to one embodiment of the invention. In the illustrated example, a first metadata 400a is transmitted where the flags field 404a indicates that the ID that is to follow is for a secondary device, and the ID field 406a identifies the particular secondary device. Following the first metadata 400a is a second metadata 400b where the flags field 404b indicates that the ID that is to follow is for a file, and the ID field 406b identifies the particular file. If the file is encrypted, the file flags in the flags field 404b indicate so, and the particular decryption key(s) 408b follows to allow the servlet to decrypt the file. Furthermore, if the file is NTFS (new technology file system) resident, the second metadata 400b is followed by a third metadata 400c where the flags field 404c indicates a fixup sector, and the ID field 406c indicates a number of fixups to follow. The actual fixups 408c are then included in the metadata.

Following the metadata information is a list of file extents for the different ranges of file-data that are to be examined by the servlets. Each file extent 300a, 300b indicates the length 302a, 302b which corresponds to a particular number of bytes of data, and the device offset 304a, 304b which corresponds to a particular beginning location of the relevant secondary storage device. After all the file extents for a current file are streamed by the examining machine, a next file is selected and associated metadata and file extents for the next file are streamed to the servlet.

Figure 6:
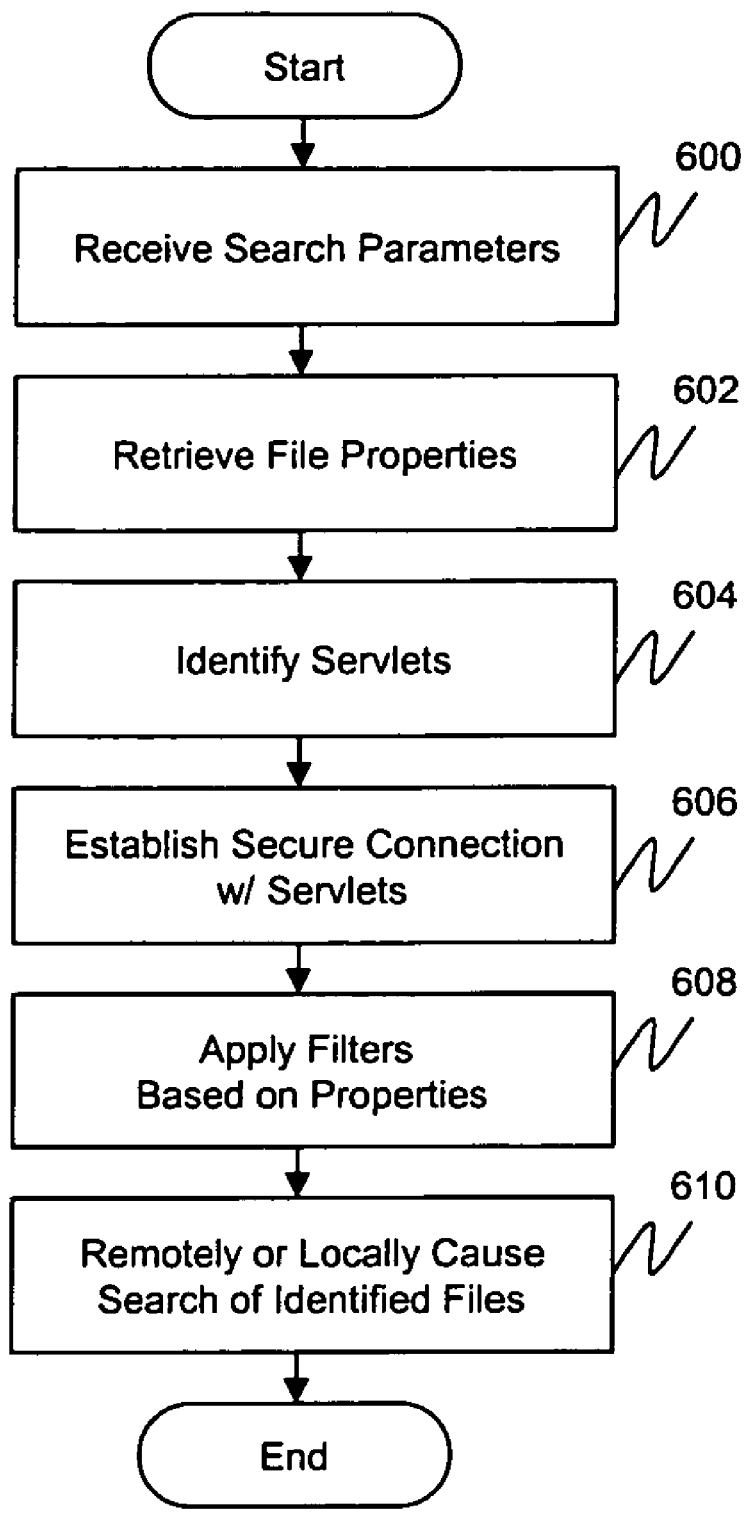
FIG. 6 is a process flow diagram of a process executed by a search module in searching for static data stored in one or more secondary devices according to one embodiment of the invention.

FIG. 6 is a process flow diagram of a process executed by the search module 204 in searching for static data stored in the secondary devices 104a-104n according to one embodiment of the invention. The process may be a software process implemented by one or more processors (not shown) in the examining machine based on instructions stored in main memory. A person of skill of art should recognize, however, that the process may be implemented via hardware, firmware, or a combination of hardware, firmware, and/or software. Furthermore, the various steps of the process may be implemented in the indicated order, or in any other order that should be appreciated by a person of skill in the art.

In step 600, the search module 204 receives one or more search parameters for conducting a search of the various target devices. According to one embodiment of the invention, the Examiner provides the search parameters by accessing the GUI provided by the search module 204. At a minimum, the Examiner identifies one or more search keys to be searched. The Examiner may further select one or more files and/or one or more target machines to search. In this regard, the GUI displays a list of such files and/or target machines for selection by the Examiner. According to one embodiment of the invention, if no specific files or target machines are specified, an assumption is made that all files and target machines are to be searched.

In step 602, the search module communicates with the file manager 206 to retrieve the file properties of the files to search, and in step 604, identifies the servlets associated with the files.

In step 606, the examining machine 115 communicates with the secure server 111 for establishing a secure connection with each identified servlet, as is described in further detail below with respect to FIGS. 9-10.

In step 608, the search module applies one or more filters to the identified files based on the retrieved file properties, for determining whether the search of one or more of the files should be conducted locally by the examining machine. Such filters include, but are not limited to file size, file type, and the like. For example, a file smaller than a threshold size may be filtered to be searched in the examining machine. Furthermore, certain file types not supported by the servlet, that is, which the servlet may be unable to open, may be filtered to be searched in the examining machine.

In step 610 the filtered files are searched locally by the search module, and the non-filtered files are searched remotely by the corresponding servlets.

Figure 7A:
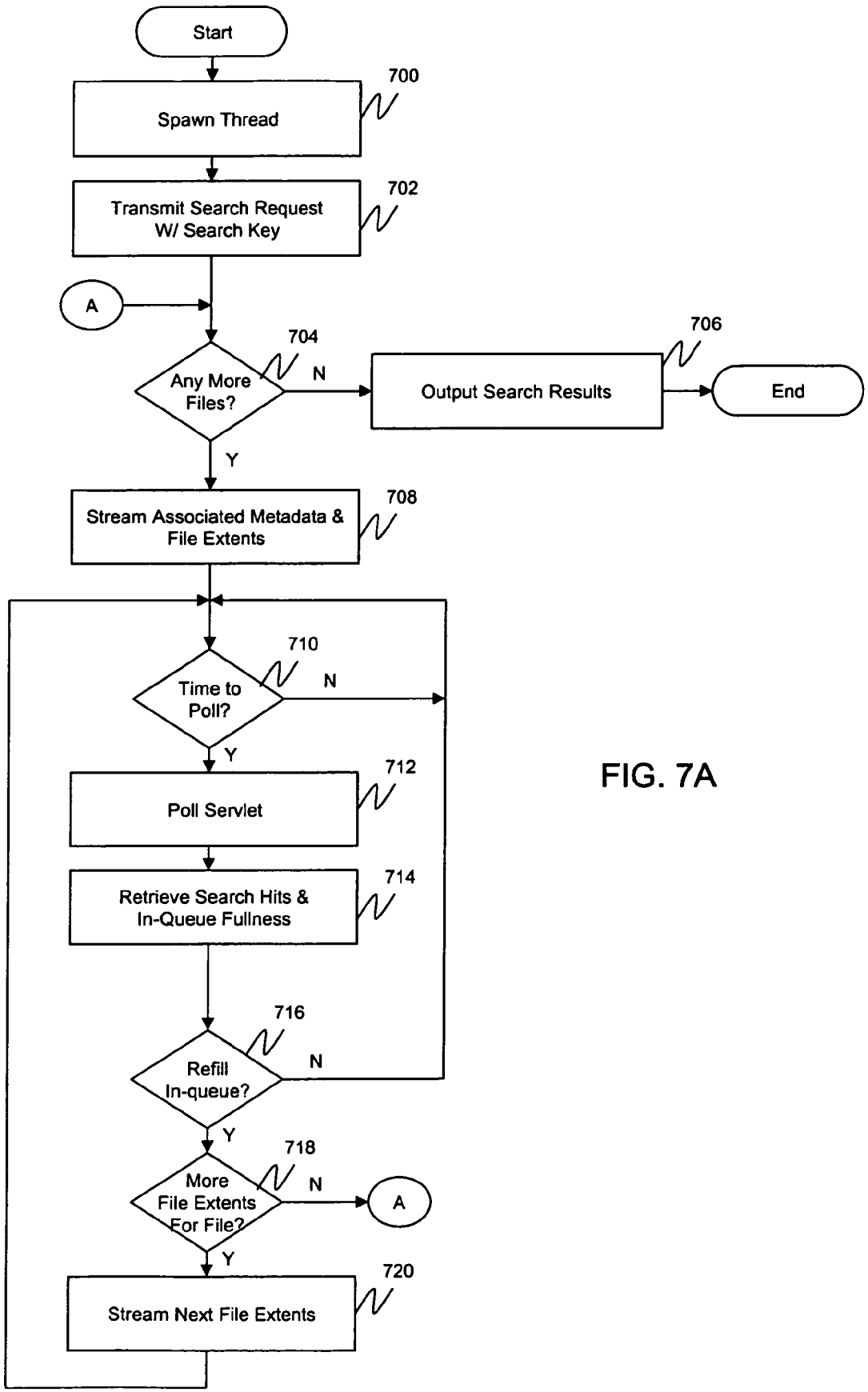
FIG. 7A is a process flow diagram for causing a particular servlet to remotely search associated one or more secondary storage devices for a search key according to one embodiment of the invention.

FIG. 7A is a more detailed process flow diagram of step 610 for causing a particular servlet to remotely search associated one or more secondary storage devices for a search key according to one embodiment of the invention. Although FIG. 7A illustrates the process with respect to a single servlet, a person of skill in the art should appreciate that the process will be invoked, in parallel, for each servlet that is to perform a search.

In step 700, the search module 204 spawns a processing thread that is dedicated to the particular servlet. In step 702, the search module transmits to the servlet, a search request including, at a minimum, the search key.

In step 704, a determination is made as to whether there are any more files associated with the servlet that need to be searched. If the answer is NO, the search by the particular servlet is complete, and the search module outputs the search results in step 706.

Otherwise, if there are more files that need to be searched, the search module streams the metadata and one or more file extents associated with the current file that is to be searched in step 708. Assuming a big enough file, enough metadata and file extents are streamed to the servlet for filling the servlet's in-queue.

In step 710, a determination is made as to whether it is time to poll the servlet for any hit results and in-queue fullness. If the answer is YES, the servlet is polled in step 712. In this regard, the search module 204 transmits to the servlet a poll request and in step 714, the search module 204 receives from the servlet, search hit information stored in the servlet's out-queue. The search module 204 further receives from the servlet information on the fullness of the servlet's in-queue. Based on this fullness information, the search module determines, in step 716, whether to refill the in-queue with more metadata and/or file extents. If the answer is YES, the search module determines, in step 718, whether there are any more file extents for the particular file that need to be streamed to the servlet. If the answer is YES, the search module proceeds to stream the next file extents in step 720. Otherwise, the search module returns to step 704 for streaming metadata and file extents for a next file.

Figure 7B:
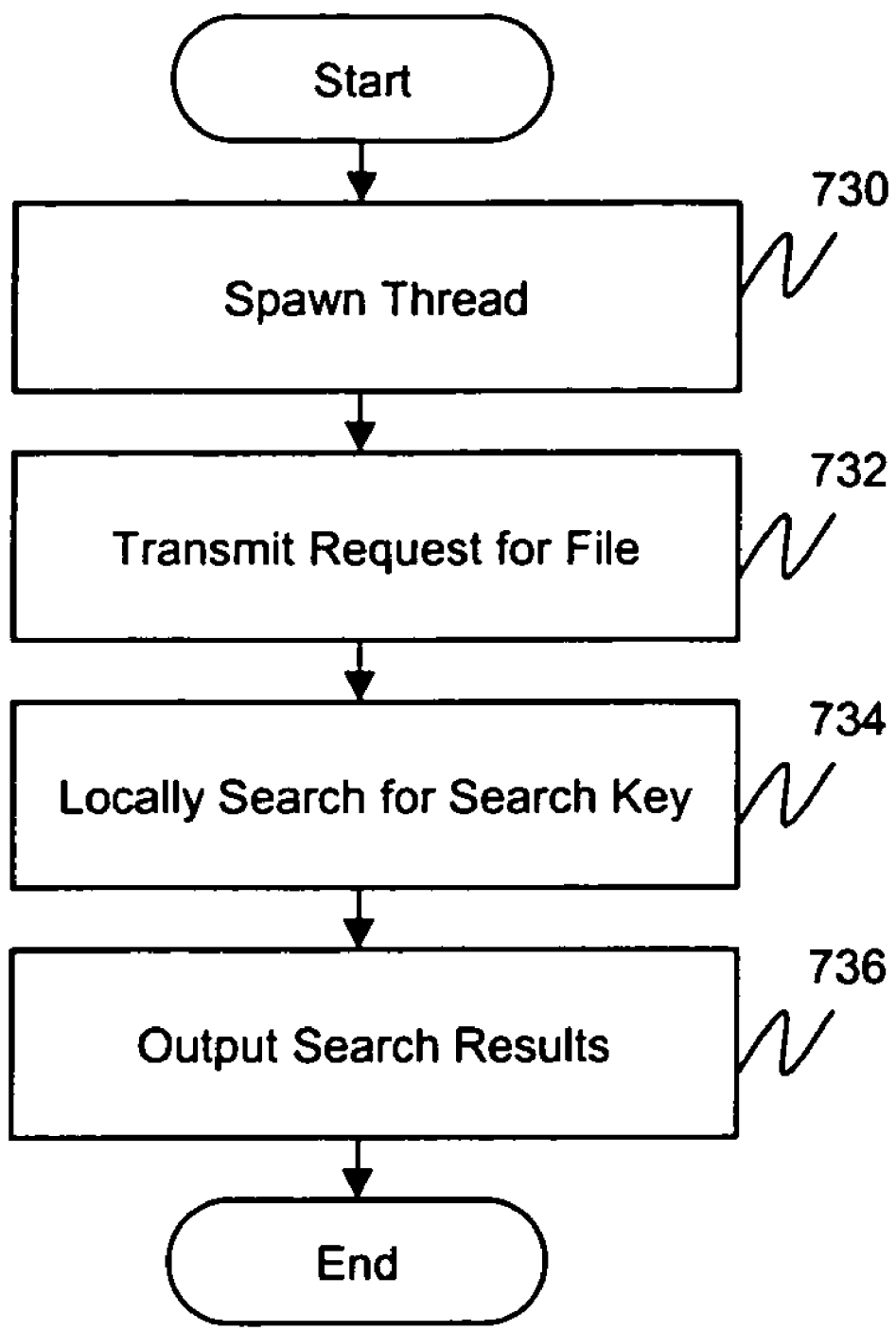
FIG. 7B is a process for locally searching a filtered file stored in a particular secondary storage device according to one embodiment of the invention.

FIG. 7B is a more detailed flow diagram of step 610 (FIG. 6) for locally searching a filtered file stored in a particular secondary storage device according to one embodiment of the invention. In step 730, the search module 204 spawns a processing thread that is dedicated to the particular servlet. In step 732, the search module 204 transmits to the servlet a request for the filtered file. In step 734, the search module locally searches for the search key and outputs the search results in step 736.

Figure 8A:
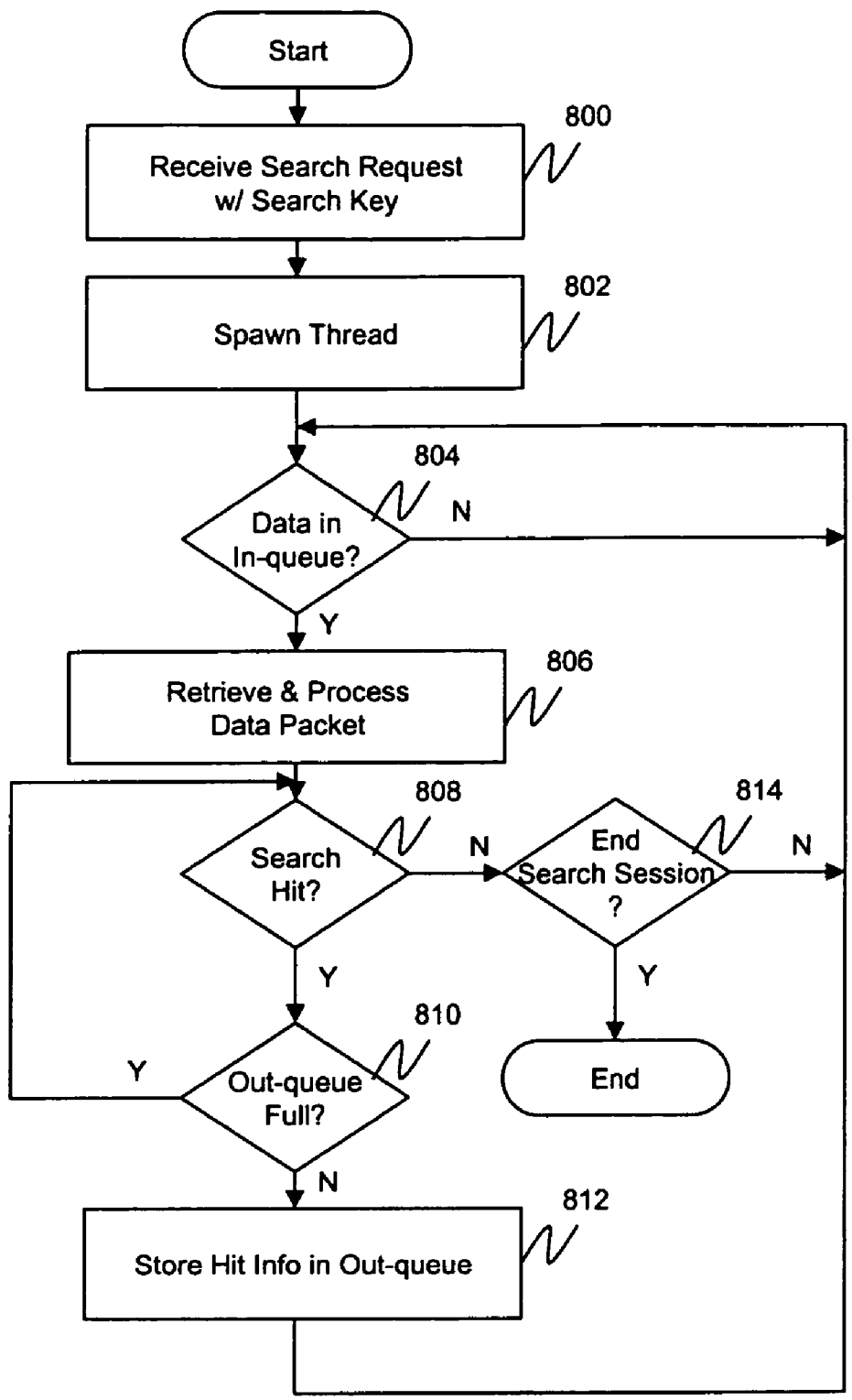
FIG. 8A is a process flow diagram of a process executed by each servlet for searching for static data stored in one or more corresponding secondary devices according to one embodiment of the invention.

FIG. 8A is a process flow diagram of a process executed by each servlet 118a-118n for searching for static data stored in one or more corresponding secondary devices 104a-104n according to one embodiment of the invention. The process may be a software process implemented by one or more processors (not shown) in the target machine based on instructions stored in main memory. A person of skill of art should recognize, however, that the process may be implemented via hardware, firmware, or a combination of hardware, firmware, and/or software. Furthermore, the various steps of the process may be implemented in the indicated order, or in any other order that should be appreciated by a person of skill in the art.

In step 800, the servlet receives from the examining machine 115, a search request including a search key. In step 802, the servlet spawns a processing thread for responding to the search request. In step 804, a determination is made as to whether there is any data in its in-queue. If the answer is YES, the servlet, in step 806, retrieves and processes the data packet stored in the in-queue. Such data may be a metadata, file extent, decryption keys, and the like. The data is used by the servlet in retrieving and searching for the search key at the range of data indicated in a retrieved file extent for a particular file and particular secondary device as indicated in a retrieved metadata. If the file is compressed, encrypted, or the like, decompression and decryption keys provided by the search module 204 is used to access the file.

In step 808, a determination is made as to whether the search resulted in a hit. If the answer is YES, a determination is made in step 810 as to whether the out-queue is full. If the answer is NO, the search hit information is stored in the out-queue in step 812.

In step 814, a determination is made as to whether the current search session is over. This may be based, for example, based on an indication from the examining machine 115 that no more files are to be searched. If the answer is YES, the process ends and the generated processing thread is destroyed.

Figure 8B:
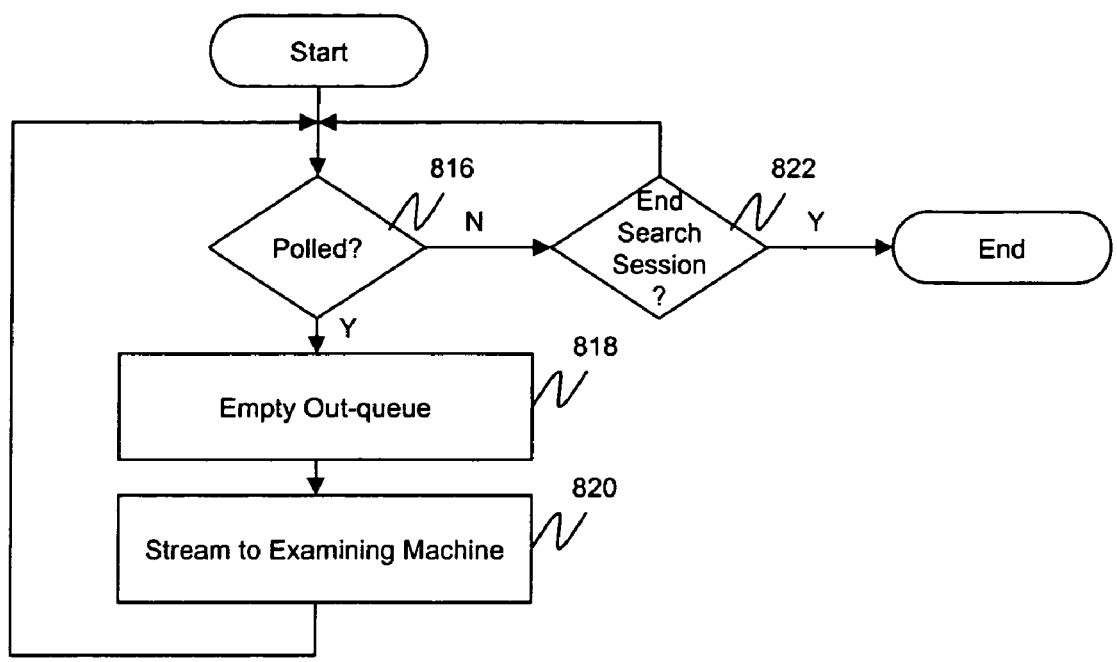
FIG. 8B is a process flow diagram of a process executed by each for outputting search results according to one embodiment of the invention.

FIG. 8B is a process flow diagram of a process executed by each servlet 118a-118n for outputting search results according to one embodiment of the invention. In step 816, a determination is made as to whether a poll request has been received from the examining machine 115. If the answer is YES, the servlet retrieves the hit results stored in the out-queue in step 818, and streams the hit results to the examining machine 115 in step 820. The monitoring for poll requests ends upon determination, in step 822, that the current search session is over.

A person of skill in the art should recognize that the mechanism for conducting searches of static data according to the above-described embodiments allow the harnessing of the computing power of each of the servlets to allow searches to be conducted faster while at the same time minimizing processing burdens on the examining machine 115. Furthermore, because the file extents are streamed in a piecemeal fashion, the performance of the servlets may be increased. Specifically, the servlets need not wait to receive all the file extents for a particular file before initiating the search of the file.

Figure 9:
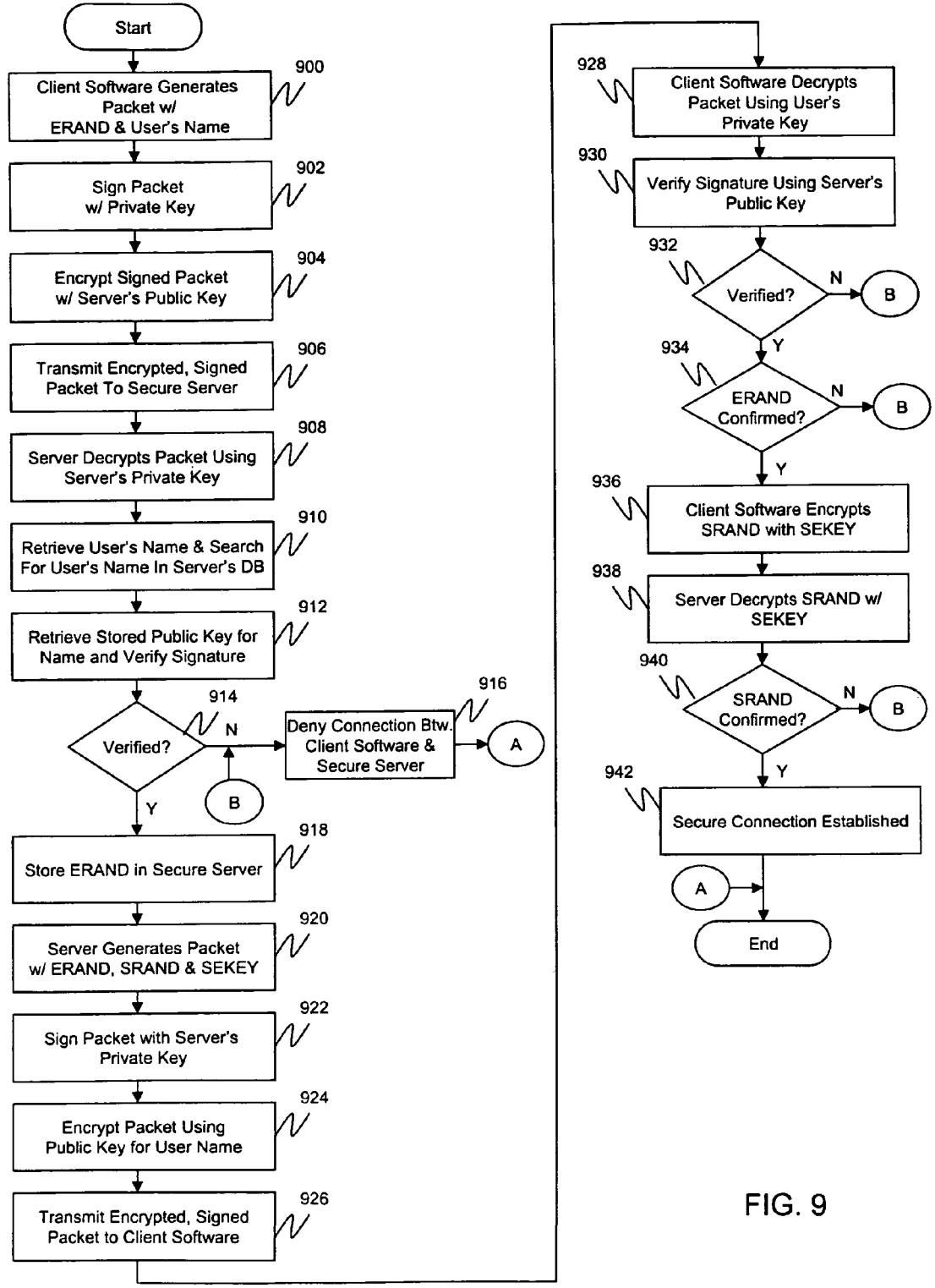
FIG. 9 is a flow diagram of a process for establishing a secure communication between an examining machine and a secure server according to one embodiment of the invention.

FIG. 9 is a flow diagram of a process for establishing a secure communication between the examining machine 115 and the secure server 111 according to one embodiment of the invention. The client software 116 resident in the examining machine 115 is invoked for establishing the secure communication. In general terms, the client software, in step 900, generates an examiner's random number "Erand" and includes it into a packet along with the examiner's user name. In step 902, the client software signs the packet with a user authentication private key as is understood by those of skill in the art. In step 904, the client software encrypts the signed packet with the secure server's public key according to conventional mechanisms, and transmits the encrypted, signed packet to the secure server 111 in step 906.

In step 908, the secure server 111 receives the packet and invokes its computer investigation software 109 to decrypt the packet using the server's private key. In step 910 the software 109 retrieves the examiner's user name from the packet and searches the server's database for a match. The matched name in the server's database includes a public user authentication key which is used in step 912 to verify the user's signature on the packet according to conventional mechanisms. If the signature is not verified, as determined in step 914, the client software cannot be authenticated and a connection between the client software and the secure server is denied in step 916.

If, however, the signature is verified, the client software may be authenticated, and the computer investigation software 109 stores the examiner's random number in step 918. In step 920, the processor generates its own server random number "Srand" and a server-to-examiner session encryption key "SEkey" to be used to encrypt future communications between the server and the examiner. These values, as well as the original examiner's random number are signed with the server's private key in step 922, encrypted with the user's public key in step 924, and transmitted to the client software in step 926.

In step 928, the client software 116 receives the packet from the secure server and decrypts it using the user's private key. In step 930, the client software verifies the server's signature with the server's public key according to conventional mechanisms. In step 932, a determination is made as to whether the signature may be verified. If the answer is YES, the server is authenticated, and the client software verifies the examiner's random number that is transmitted by the server to confirm that it is, in fact, the same number that was sent to the server. If the number may be confirmed, as is determined in step 934, the examiner creates another packet to send back to the server 111. This packet includes the server random number which is encrypted, in step 936, with the server-to-examiner session key. The encrypted packet is then transmitted to the server.

In step 938, the server's computer investigation software 109 decrypts the packet containing the server random number with the server-to-examiner session key. If the received server random number is the same number originally generated and sent to the client software as is determined in step 940, the number is confirmed, and a secure connection is established in step 942. The process for establishing a secure connection between the client software and the secure server 111 is described in more detail in U.S. application Ser. No. 10/176, 349.

Once a secure connection is established, an examiner may use its client software 116 to request investigation of the target machines across the network in support of incident response, information auditing, and forensic discovery. The secure server 111 authorizes and securely brokers requests and communications from the client software to the target machines. The communication between the server and the client software is encrypted using the server-to-examiner session encryption key.

Figure 10:
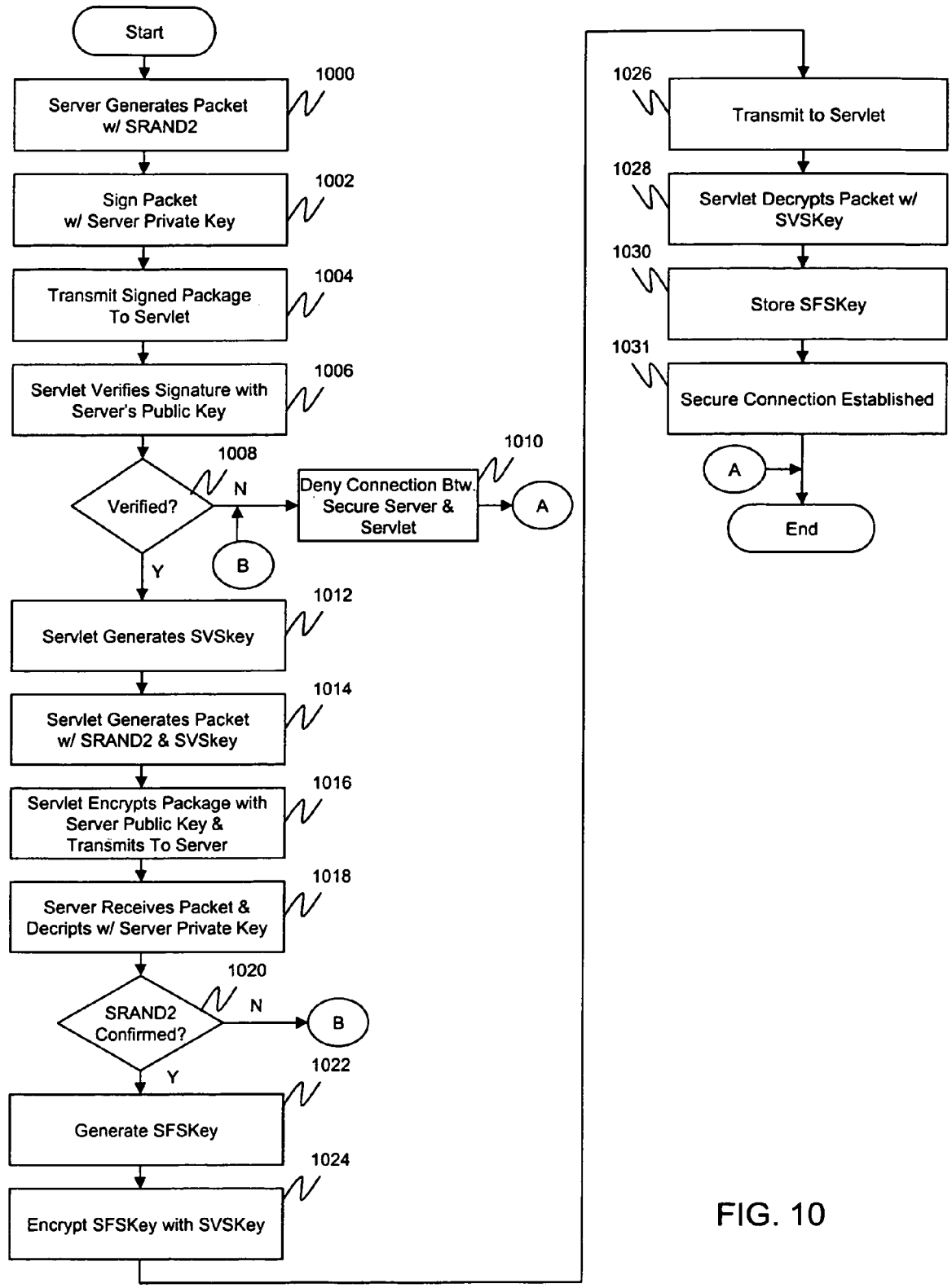
FIG. 10 is a flow diagram of a process for establishing a secure communication between secure server and a servlet according to one embodiment of the invention.

FIG. 10 is a flow diagram of a process for establishing a secure communication between the secure server 111 and the servlet 118 according to one embodiment of the invention. A number of such secure communications may be established concurrently.

In step 1000, the server's computer investigation software 109 generates a second server random number "Srand2," and signs the packet with the server's private key in step 1002. In step 1004, the software 109 transmits the signed packet to the servlet.

The servlet receives the packet signed with the second server random number, and in step 1006, verifies the signature with the server's public key. If the signature cannot be verified, as is determined in step 1008, a safe connection between the secure server 111 and the servlet 118 is denied in step 1010.

If, however, the server's signature is verified, the servlet generates a servlet-to-server session encryption key in step 1012 and inserts it into a packet in step 1014 along with the second server random number. The servlet encrypts the packet in step 1016 with the server's public key, and transmits the packet to the server 111.

In step 1018, the server's computer investigation software 109 receives the encrypted packet and decrypts it with the server's private key. The processor further confirms in step 1020, whether the second server random number is the same number that was originally sent to the servlet. If the answer is YES, the processor generates a server-to-servlet session encryption key in step 1022, and encrypts the server-to-servlet session encryption key with the servlet-to-server session encryption key in step 1024. In step 1026, the encrypted packet is transmitted to the servlet.

In step 1028, the servlet decrypts the packet with the servlet-to-server session key, and stores the server-to-servlet session key in step 1030. In step 1031, a secure connection is established, and all subsequent data exchanges between the server and the servlet are encrypted using the server-to-sevlet session key. The establishment of a secure connection between the secure server 111 and the servlet 118 is described in more detail in U.S. application Ser. No. 10/176,349.

Once the server 111 has successfully established secure connections with the examining machine 115 and one or more servlets, the examining machine 115 and the servlets may communicate directly in effectuating searches of static data stored in one or more secondary storage devices coupled to the servlets.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. In a networked computer investigation system including a client device and a plurality of target devices coupled to the client device, a method for investigating data stored in one or more storage devices coupled to the plurality of target devices, the method comprising:

Identifying by the client device a search key;

Identifying by the client device, based on file metadata, a first file stored in a first storage device coupled to a first target device and a second file stored in a second storage device coupled to a second target device;

Transmitting the search key to the first and second target devices over a secure data communications network;

Streaming by the client device, over the secure data communications network, a plurality of first file extents associated with the first file to the first target device, and a plurality of second file extents associated with the second file to the second target device, each file extent identifying a range of data of the corresponding file to be searched;

Receiving and processing by respectively the first and second target devices the streamed first and second file extents, Storing the received first and second file extents in respectively first and second in-queues at respectively the first and second target devices;

Monitoring fullness of the first and second in-queues;

Responsive to the monitoring, streaming by the client device a second plurality of first file extents associated with the first file to the first target device and a second plurality of second file extents associated with the second file to the second target device, over the secure data communications network;

Concurrently searching by the first and second target devices for the search key at respectively each range of data specified in each received first file extent and at each range of data specified in each received second file extent; and Generating search results by the first and second target devices based on the respective searching of each range of data, wherein the search results identify information relating to the search key located during the searching.

2. The method of claim 1 further comprising:
maintaining by the client device a file directory of files stored in the first and second storage devices; and
retrieving by the client device file properties information on the first and second files.

3. The method of claim 2, wherein the file properties information includes file access information streamed to the first and second target devices for respectively accessing the first and second files.

4. The method of claim 1 further comprising:
storing first and second search results in respectively first and second out-queues at respectively the first and second target devices;
polling a particular out-queue coupled to a particular target device by the client device during a polling period; and
streaming by the particular target device one or more search results stored in the particular out-queue responsive to the poll.

5. The method of claim 1 further comprising:
establishing secure communication between a server and the client device over a data communications network;
establishing secure communication between the server and each of the target devices over the data communications network; and
establishing secure communication between the client device and each of the target devices over the data communications network.

6. The method of claim 1 further comprising:
identifying by the client device a third file stored in a particular storage device coupled to a particular target device;
retrieving file properties of the third file;
determining based on the file properties whether the third file meets one or more filter criteria;
transmitting a request to the particular target device for the third file responsive to the determination;
receiving the third file from the particular target device responsive to the request;
locally searching the third file by the client device responsive to the filtering.

7. The method of claim 6, wherein the one or more filter criteria is a size of the third file.

8. The method of claim 1, wherein the first and second storage devices are hard disks.

9. A computer investigation system comprising:
a client device;
first and second target devices coupled to the client device over a data communications network;
first and second storage devices coupled respectively to the first and second target devices;
a server brokering secure communication between the client device and the first and second target devices over the data communications network, wherein the client device:
identifies a search key,
identifies, based on file metadata, a first file stored in the first storage device coupled to the first target device and a second file stored in the second storage device coupled to the second target device,
Transmits the search key to the first and second target devices over a secure data communications network, and
Streams over the secure data communications network plurality of first file extents associated with the first file to the first target device, and a plurality of second file extents associated with the second file to the second target device, each file extent identifying a range of data of the corresponding file to be searched,
Wherein the first and second target devices respectively:
Receive and process the streamed first and second file extents,
Concurrently search for the search key at respectively each range of data specified in each received first file extent and at each range of data specified in each received second file extent, and
Respectively generating search results based on the searching of each range of data, wherein the search results identify information relating to the search key located during the searching; and
First and second in-queues respectively coupled to the first and second target devices and respectively storing the received first and second file extents,
Wherein the first and second in-queues are monitored for fullness, and
in response to the monitoring, the client device streams a second plurality of first file extents associated with the first file to the first target device and a second plurality of second file extents associated with the second file to the second target device for causing the first and second target devices to search for the search key at the range of data specified in respectively each of the second plurality of first file extents and each of the second plurality of second file extents.

10. The system of claim 9, wherein the client device maintains a file directory of files stored in the first and second storage devices and retrieves file property information on the first and second files.

11. The system of claim 10, wherein the file properties information includes file access information streamed to the first and second target devices for respectively accessing the first and second files.

12. The system of claim 9 further comprising:
first and second out-queues respectively coupled to the first and second target devices, the first and second out-queues respectively storing first and second search results, wherein the client device polls a particular out-queue coupled to a particular target device during a polling period and, responsive to the poll, the particular target device streams one or more search results stored in the particular out-queue.

13. The system of claim 9, wherein the server establishes secure communication with the client device over a data communications network and further establishes secure communication with each of the target devices for allowing secure communication between the client device and each of the target devices.

14. The system of claim 9, wherein the client device identifies a third file stored in a particular storage device coupled to a particular target device, retrieves file properties of the third file, determines based on the file properties whether the third file meets one or more filter criteria, transmits a request to the particular target device for the third file responsive to the determination, receives the third file from the particular target device responsive to the request, and locally searches the third file responsive to the filtering.

15. The system of claim 14, wherein the one or more filter criteria is a size of the third file.

16. The system of claim 9, wherein the first and second storage devices are hard disks.

17. In a networked computer investigation system, a client device investigating data stored in first and second storage devices respectively coupled to first and second target devices, the client device comprising:
a processor;
a memory operably coupled to the processor and storing program instructions therein, the processor being operable to execute the program instructions, the program instructions including:
identifying a search key;
identifying, based on file metadata, a first file stored in the first storage device coupled to the first target device and a second file stored in the second storage device coupled to the second target device;
transmitting the search key to the first and second target devices over a secure data communications network;
streaming over the secure data communications network a plurality of first file extents associated with the first file to the first target device, and a plurality of second file extents associated with the second file to the second target device, each file extent identifying a range of data of the corresponding file to be searched,
Wherein the first and second target devices are configured to concurrently search for the search key at respectively each range of data specified in each received first file extent and at each range of data specified in each received second file
Wherein the first and second target devices are respectively coupled to first and second in-queues respectively storing received first and second file extents,
Wherein the first and second in-queues are monitored for fullness;
responsive to the monitoring, streaming by the client device a second plurality of first file extents associated with the first file to the first target device and a second plurality of second file extents associated with the second file to the second target device, over the secure data communications network,
wherein the first and second target devices are configured to search for the search key at the range of data specified in respectively each of the second plurality of first file extents and each of the second plurality of second file extents; and
Receiving first and second search results generated by respectively the first and second target devices based on the respective searching of each range of data, wherein the search results identify information relating to the search key located during the searching.

18. The client device of claim 17 further comprising:
a file manager maintaining a file directory of files stored in the first and second storage devices and retrieving file properties information on the first and second files.

19. The client device of claim 18, wherein the file properties information includes file access information streamed to the first and second target devices for respectively accessing the first and second files.

20. The client device of claim 19, wherein the computer instructions further comprise:
identifying a third file stored in a particular storage device coupled to a particular target device;
retrieving file properties of the third file;
determining based on the file properties whether the third file meets one or more filter criteria;
transmitting a request to the particular target device for the third file responsive to the determination;
receiving the third file from the particular target device responsive to the request; and
locally searching the third file responsive to the filtering.

21. The method of claim 1, wherein respectively the first and second target devices receiving the streamed first and second file extents each proceed to search contents of the corresponding file for the search key at the range of data specified in a received first one of the streamed file extents before receipt of a second one of the streamed file extents.

22. The method of claim 1 further comprising:
displaying the search results on a display monitor coupled to the client device.

23. The method of claim 1, wherein the search key is a non-metadata data pattern contained in the first or second file.

24. The method of claim 1, wherein the first and second file extents respectively identify blocks of data storing contents of respectively the first and second files.

25. The method of claim 1 further comprising:
retrieving by the client device file properties of the first and second files to be searched; and
determining by the client device, based on the retrieved file properties, whether each of the first and second files to be searched satisfies a filter criteria, wherein the filter criteria is selected from a group consisting of a threshold file size and file type, wherein the transmitting, streaming, receiving, identifying, concurrently searching, and generating steps with respect to the first and second target devices are engaged only if the determining outputs a first result with respect to the corresponding first or second file, but if the determining outputs a second result:
  receiving the corresponding first or second file by the client device from the corresponding first or second target device; and
  searching the contents of the corresponding file locally by the client device for the search key instead of invoking the corresponding first or second target device.

26. In a networked computer investigation system including a client device and a plurality of target devices coupled to the client device, a method for investigating data stored in one or more storage devices coupled to the plurality of target devices, the method comprising:
  identifying by the client device the search key for conducting a search of contents of files stored in the various target devices;
  identifying by the client device, based on file metadata, a first file stored in a first storage device coupled to a first target device and a second file stored in a second storage device coupled to a second target device;
  retrieving by the client device file properties of the first and second files to be searched;
  determining by the client device, based on the retrieved file properties, whether the first and second files to be searched each satisfies a filter criteria;
  if the determining outputs a first result:
    transmitting by the client device the search key to the first and second target devices over a secure data communications network;
    streaming by the client device over the secure data communications network a plurality of first file extents associated with the first file to the first target device, and a plurality of second file extents associated with the second file to the second target device, each file extent identifying a range of data of the corresponding file to be searched;
    receiving and processing by respectively the first and second target devices the streamed first and second file extents;
    storing the received first and second file extents in respectively first and second in-queues at respectively the first and second target devices;
    monitoring fullness of the first and second in-queues;
    responsive to the monitoring, streaming by the client device a second plurality of first file extents associated with the first file to the first target device and a second plurality of second file extents associated with the second file to the second target device, over the secure data communications network;
    concurrently searching by the first and second target devices for the search key at respectively each range of data specified in each received first file extent and at each range of data specified in each received second file extent; and
    receiving by the client device from the one of the plurality of target devices search results generated by the first and second target devices based on the respective searching of each range of data, wherein the search results identify information relating to the search key located during the searching; and
  if the determining outputs a second result:
    receiving the file by the client device from one of the plurality of target devices; and
    searching the contents of the file locally by the client device for the search key instead of invoking the plurality of target devices.

27. The method of claim 1, wherein the search results identify a location in which the search key is stored.

28. The method of claim 22, wherein the first file is identified by a first file identifier included in the first file metadata and the second file is identified by a second file identifier included in the second file metadata.

29. The method of claim 1 further comprising:
  streaming by the client device first file metadata and second file metadata to respectively the first target device and the second target device; and
  identifying by respectively the first and second target devices the first and second files based on the received first and second file metadata.

30. The method of claim 1, wherein the monitoring fullness of the first and second in-queues is by the client device.

* * * * *